(12) United States Patent
Masumura et al.

(10) Patent No.: US 11,758,118 B2
(45) Date of Patent: Sep. 12, 2023

(54) STEREOSCOPIC DISPLAY SYSTEM

(71) Applicants: Tianma Japan, Ltd., Kanagawa (JP); Wuhan Tianma Micro-Electronics Co., Ltd., Wuhan (CN)

(72) Inventors: Kazunori Masumura, Kanagawa (JP); Tetsushi Sato, Kanagawa (JP)

(73) Assignees: TIANMA JAPAN, LTD., Kanagawa (JP); Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 17/075,027

(22) Filed: Oct. 20, 2020

(65) Prior Publication Data
US 2021/0120227 A1    Apr. 22, 2021

(30) Foreign Application Priority Data
Oct. 21, 2019    (JP) ................. 2019-192074

(51) Int. Cl.
*H04N 13/376*    (2018.01)
*H04N 13/302*    (2018.01)
*H04N 13/368*    (2018.01)

(52) U.S. Cl.
CPC ......... *H04N 13/376* (2018.05); *H04N 13/302* (2018.05); *H04N 13/368* (2018.05)

(58) Field of Classification Search
USPC ........................................................ 348/51
See application file for complete search history.

(56) References Cited

U.S. PATENT DOCUMENTS

| 2002/0075384 | A1  | 6/2002  | Harman |
| 2004/0240708 | A1  | 12/2004 | Hu et al. |
| 2008/0278805 | A1* | 11/2008 | Schwerdtner ........ H04N 13/368 359/463 |
| 2010/0079449 | A1* | 4/2010  | McCarthy ............... G06F 3/012 345/419 |

(Continued)

FOREIGN PATENT DOCUMENTS

| JP | 2001-524764 A | 12/2001 |
| JP | 5095851 B1    | 12/2012 |
| JP | 2013-143749 A | 7/2013  |

OTHER PUBLICATIONS

Office Action dated Jun. 27, 2023 in Japanese Application No. 2019-192074.

*Primary Examiner* — Mikhail Itskovich
(74) *Attorney, Agent, or Firm* — Sughrue Mion, PLLC

(57) ABSTRACT

A control system is configured to acquire an image captured by an imaging device, and display a stereoscopic image on a display apparatus based on a position of an observer detected in a predetermined tracking area in the acquired image. The tracking area is a part of an area in which an observer is trackable and the tracking area includes a stereoscopic viewing zone in which a stereo image can be recognized from the stereoscopic image. The control system is further configured to display a stereoscopic image for a predetermined time based on a position at which the observer is detected last after the detected observer has become untrackable in the tracking area, and display a stereoscopic image suitable for a predetermined position in the stereoscopic viewing zone in a case where no observer is detected in the tracking area over the predetermined time.

6 Claims, 11 Drawing Sheets

(56) References Cited

U.S. PATENT DOCUMENTS

| | | |
|---|---|---|
| 2013/0050417 A1 | 2/2013 | Wang et al. |
| 2013/0182076 A1 | 7/2013 | Mizutani |
| 2014/0002620 A1* | 1/2014 | Murakami ........... H04N 13/366 |
| | | 348/51 |

* cited by examiner

| TIME | T1 | T2 | T3 | T4 | T5 | T6 | T7 |
|---|---|---|---|---|---|---|---|
| DISPLAYED IMAGE | (blank) | motorcycle image | motorcycle image | motorcycle image | motorcycle image | motorcycle image | motorcycle image |
| POSITIONAL RELATION | 10 DISPLAY APPARATUS; TRACKING AREA 401; P OPTIMUM VIEWING POINT | | 50 OBSERVER | | | | |
| PRESENCE OF OBSERVER | NOT PRESENT WITHIN PREDETERMINED TIME | NOT PRESENT WITHIN PREDETERMINED TIME | PRESENT | PRESENT | NOT PRESENT WITHIN PREDETERMINED TIME | NOT PRESENT OVER PREDETERMINED TIME | PRESENT |
| IMAGE PROCESSING | NOT GENERATE IMAGE BECAUSE POSITIONAL INFORMATION DOES NOT EXIST (e.g., IMMEDIATELY AFTER POWER-ON) | GENERATE IMAGE BASED ON OPTIMUM VIEWING POINT | GENERATE IMAGE BASED ON OBSERVER'S POSITION | GENERATE IMAGE BASED ON OBSERVER'S POSITION | GENERATE IMAGE BASED ON POSITION ACQUIRED LAST | GENERATE IMAGE BASED ON OPTIMUM VIEWING POINT | GENERATE IMAGE BASED ON OBSERVER'S POSITION |

FIG. 6

STEREOSCOPIC DISPLAY SYSTEM

CROSS-REFERENCE TO RELATED APPLICATIONS

This non-provisional application claims priority under 35 U.S.C. § 119(a) on Patent Application No. 2019-192074 filed in Japan on Oct. 21, 2019, the entire content of which is hereby incorporated by reference.

BACKGROUND

This disclosure relates to a stereoscopic display system.

Autostereoscopic display apparatuses utilizing binocular parallax are known. The autostereoscopic display apparatuses include a display panel and a light control element disposed in front of the display panel. The display panel displays an image for the right eye and an image for the left eye simultaneously with pixels for the right eye and pixels for the left eye that are disposed alternately. The light control element can be a parallax barrier or a lenticular lens to make the observer see the image for the right eye with only the right eye and see the image for the left eye with only the left eye. As a result, the observer can recognize a stereo image without using an optical element such as special glasses.

Meanwhile, an autostereoscopic display system is known that work with a tracking device for tracking the observer to make the observer to recognize a stereo image in a wide space. The autostereoscopic display system generates an image to be displayed by the autostereoscopic display apparatus in real time based on the positions of the observer's eyes acquired by the tracking device and the optical characteristics of the autostereoscopic display apparatus to provide the observer with a stereo image comfortable to see.

SUMMARY

A stereoscopic display system according to an aspect of this disclosure includes a display apparatus configured to display a stereoscopic image, and a control system. The control system is configured to acquire an image captured by an imaging device, and display a stereoscopic image on the display apparatus based on a position of an observer detected in a predetermined tracking area in the acquired image. The tracking area is a part of an area in which an observer is trackable and the tracking area includes a stereoscopic viewing zone in which a stereo image can be recognized from the stereoscopic image. The control system is further configured to display a stereoscopic image for a predetermined time based on a position at which the observer is detected last after the detected observer has become untrackable in the tracking area, and display a stereoscopic image suitable for a predetermined position in the stereoscopic viewing zone in a case where no observer is detected in the tracking area over the predetermined time.

It is to be understood that both the foregoing general description and the following detailed description are exemplary and explanatory and are not restrictive of this disclosure.

BRIEF DESCRIPTION OF THE DRAWINGS

FIG. 6 illustrates an example of change of the position of a detected observer and the displayed image over time;

EMBODIMENTS

Figure 1:
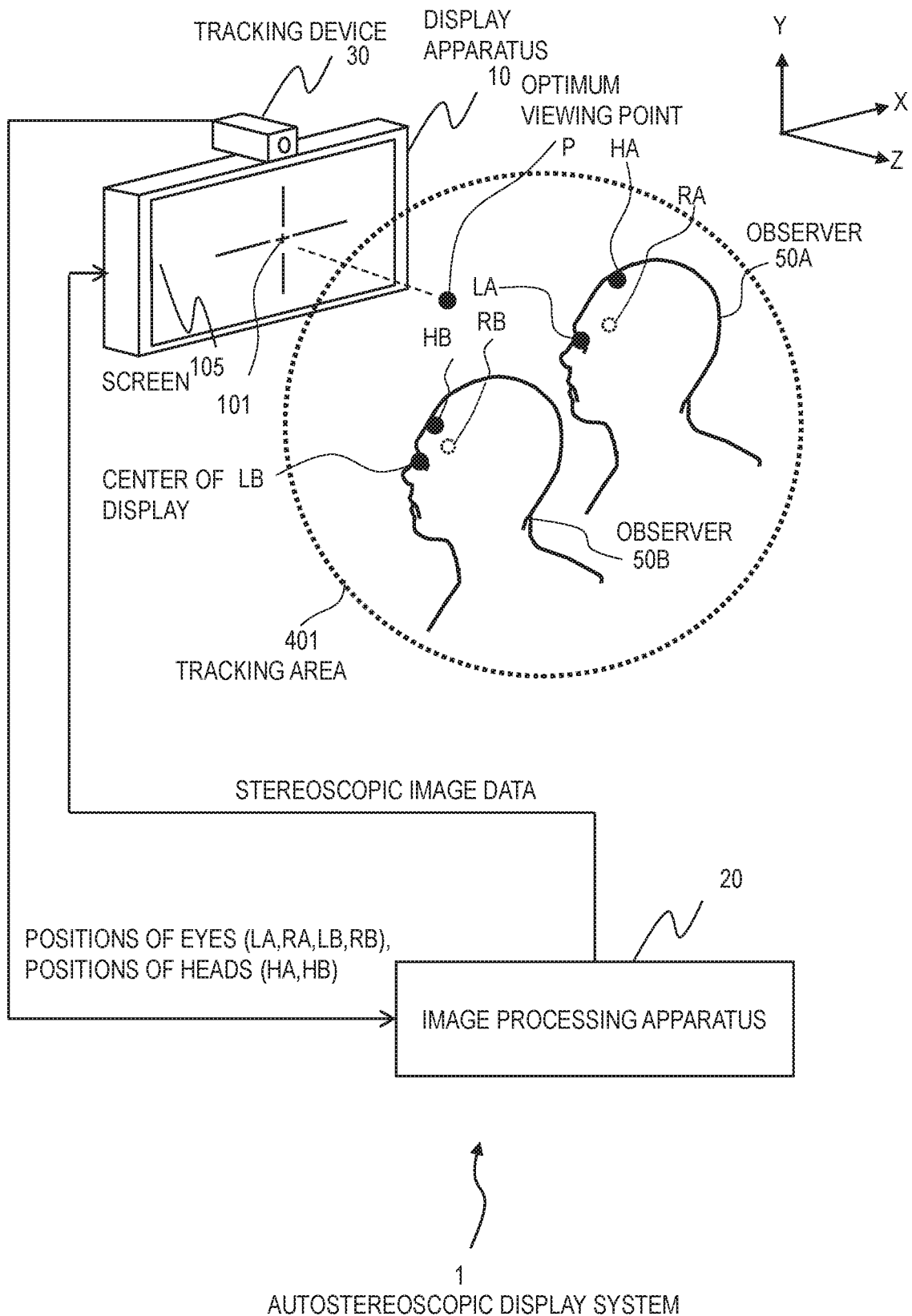
FIG. 1 schematically illustrates a configuration example of an autostereoscopic display system.

Hereinafter, embodiments are described specifically with reference to the accompanying drawings. For clear understanding of description, the elements in the drawings may be exaggerated in size or shape. It should be noted that the following description is to explain the embodiments of this disclosure but not to limit the scope of this disclosure.

The autostereoscopic display system disclosed herein includes a display apparatus for displaying a stereoscopic image and a control system for generating the image to be displayed with the display apparatus. The stereoscopic image can be a still image or a motion picture. The control system detects the position of the observer within a predetermined tracking area in an image taken by an imaging device. The tracking area is a part of the area the control system is capable of detecting or tracking an observer therein and includes a stereoscopic viewing zone in which the observer can recognize a stereo image. The control system generates a stereoscopic image based on the position of the observer detected in the tracking area and displays it with the display apparatus.

This displaying a stereoscopic image based on the position of the observer detected in the predetermined tracking area reduces the frequency of changing the displayed stereoscopic image to suit for the position of a person different from the intended observer.

When the observer tracked within the tracking area becomes missing, the control system displays a stereoscopic image based on the last detected position of the observer for a predetermined time. If no observer is detected in the tracking area during the predetermined time, the control system displays a stereoscopic image for a predetermined position in the stereoscopic viewing zone.

This configuration reduces the frequency of undesirable changes of stereoscopic images by maintaining a stereoscopic image for an observer, even when the observer is temporarily lost within the tracking area. Further, this configuration eliminates unnecessary changes of stereoscopic images by displaying a stereoscopic image for a predetermined position in the stereoscopic viewing zone when no observer is present.

The stereoscopic viewing zone depends on the characteristics of the display apparatus. The stereoscopic viewing zone can be composed of one continuous area or a plurality of isolated subareas. The tracking area can be composed of one continuous area or a plurality of isolated subareas. An example of the tracking area includes the stereoscopic viewing zone. The tracking area can include an area outside the stereoscopic viewing zone. Another example of the tracking area is one continuous area and coincides with the stereoscopic viewing zone of one continuous area. Still another example of the tracking area is composed of a plurality of subareas and each subarea coincides with a subarea of the stereoscopic viewing zone. The tracking area can coincide with a part of the stereoscopic viewing zone or include a part of the stereoscopic viewing zone and an area outside the stereoscopic viewing zone.

Embodiment 1

FIG. 1 schematically illustrates a configuration example of an autostereoscopic display system. The autostereoscopic display system 1 includes a display apparatus 10, an image processing apparatus 20, and a tracking device 30. The display apparatus 10 includes a display device and an optical element provided in front of the screen of the display device (between the screen and the observer). The display device can be a liquid crystal display device or an organic light emitting diode (OLED) display device. Any kinds of display devices can be employed. The display device includes a display panel including a plurality of pixels disposed in a matrix, driving circuits for driving the pixels of the display panel, and a control circuit for the driving circuits, for example.

The display device simultaneously displays an image for the right eye and an image for the left eye with the pixels for the right eye and the pixels for the left eye that are disposed alternately. The light control element can be a parallax barrier or a lenticular lens, which makes the image for the right eye be seen with only the observer's right eye and the image for the left eye be seen with only the observer's left eye.

The tracking device 30 tracks one or more observers who observe the image displayed on the display apparatus 10. The tracking device 30 includes a camera (imaging device) for taking a motion picture to detect and track the observers within the trackable area in the captured image. The trackable area is an area to allow the tracking device 30 to detect (determines) the observer's position in the captured image. In an example, the tracking device 30 is fixed atop of the display apparatus 10; the area to be captured by the camera is unchangeable.

The tracking device 30 detects the positions of the observer's eyes. In an example, the tracking device 30 further detects the position of a predetermined body part other than the eyes. The predetermined body part can be the head (the part upper than the neck) or shoulders. The position of the head can be the position of a predetermined point in the detected head, such as the centroid of the detected head. The head is a body part having a specific and unchangeable positional relation with the eyes.

In the example of FIG. 1, the tracking device 30 determines the positions of the eyes and the head of the observer in the space defined by the X-axis, the Y-axis, and the Z-axis and sends the positions to the image processing apparatus 20. The X-axis and the Y-axis are parallel to the screen 105 of the display apparatus 10 and the Z-axis is perpendicular to the screen 105. The X-axis is parallel to the horizontal direction of the screen 105 and the Y-axis is parallel to the vertical direction of the screen 105.

In the example of FIG. 1, two observers 50A and 50B are tracked. The positions of the left eye, the right eye, and the head of the observer 50A are denoted by LA, RA, and HA, respectively. The positions of the left eye, the right eye, and the head of the observer 50B are denoted by LB, RB, and HB, respectively. If any of the left eye, the right eye, and the head cannot be located, data indicating the situation, such as a NULL value, is forwarded.

The image processing apparatus 20 acquires positional data of the observers 50A and 50B in real time. The image processing apparatus 20 generates a stereoscopic image based on the positions of one of the observers being tracked (detected) in the tracking area 401. The image processing apparatus 20 generates the stereoscopic image based on the central position between the eyes.

If the central position between the eyes cannot be located, the image processing apparatus 20 generates a stereoscopic image based on the position of the observer's head. Then, a stereoscopic image appropriate for the selected observer can be displayed even if the central position between the eyes cannot be located. Detecting the position of the observer's head is optional. The tracking area 401 is a part of the area trackable by the tracking device 30. The details of the tracking area 401 will be described later.

This embodiment is configured to select the observer 50A from the observers in the tracking area 401 and generate a stereoscopic image based on the position of the observer 50A. The policies in selecting one observer from a plurality of observers in the tracking area 401 will be described later. The tracking device 30 can be configured to send only the positional data of the observers detected in the predetermined tracking area 401 to the image processing apparatus 20.

When an observer being tracked is lost in the tracking area 401, the image processing apparatus 20 displays a stereoscopic image based on the last position of the observer for a predetermined period. This configuration reduces the possibility of changing the stereoscopic image inappropriately when the observer is still in the tracking area 401 but cannot be tracked temporarily for some reason (for example, the observer has turned the face away).

The area in which the observer can appropriately recognize a stereo image (which is called a stereoscopic viewing zone) is determined in accordance with the characteristics of the display apparatus 10. The characteristics of the display apparatus 10 are designed to have a stereoscopic viewing zone based on the average pupillary distance of adult humans of 63 mm, for example. An optimum viewing point P can be defined in the stereoscopic viewing zone. The details of the stereoscopic viewing zone and the optimum viewing point P will be described later. In the example of FIG. 1, one optimum viewing point P is defined and it is located at a specific distance from the center of the display 101 on the display apparatus 10 along the normal (in the direction normal) to the screen of the display apparatus 10.

When an observer is not detected in the tracking area 401 over a predetermined period, the image processing apparatus 20 displays a predetermined stereoscopic image. In an example, the image processing apparatus 20 displays a stereoscopic image for the optimum viewing point. As a result, unnecessary changes of stereoscopic images can be eliminated. The predetermined position (reference position) to display a stereoscopic image can be different from the optimum viewing point.

Figure 2:
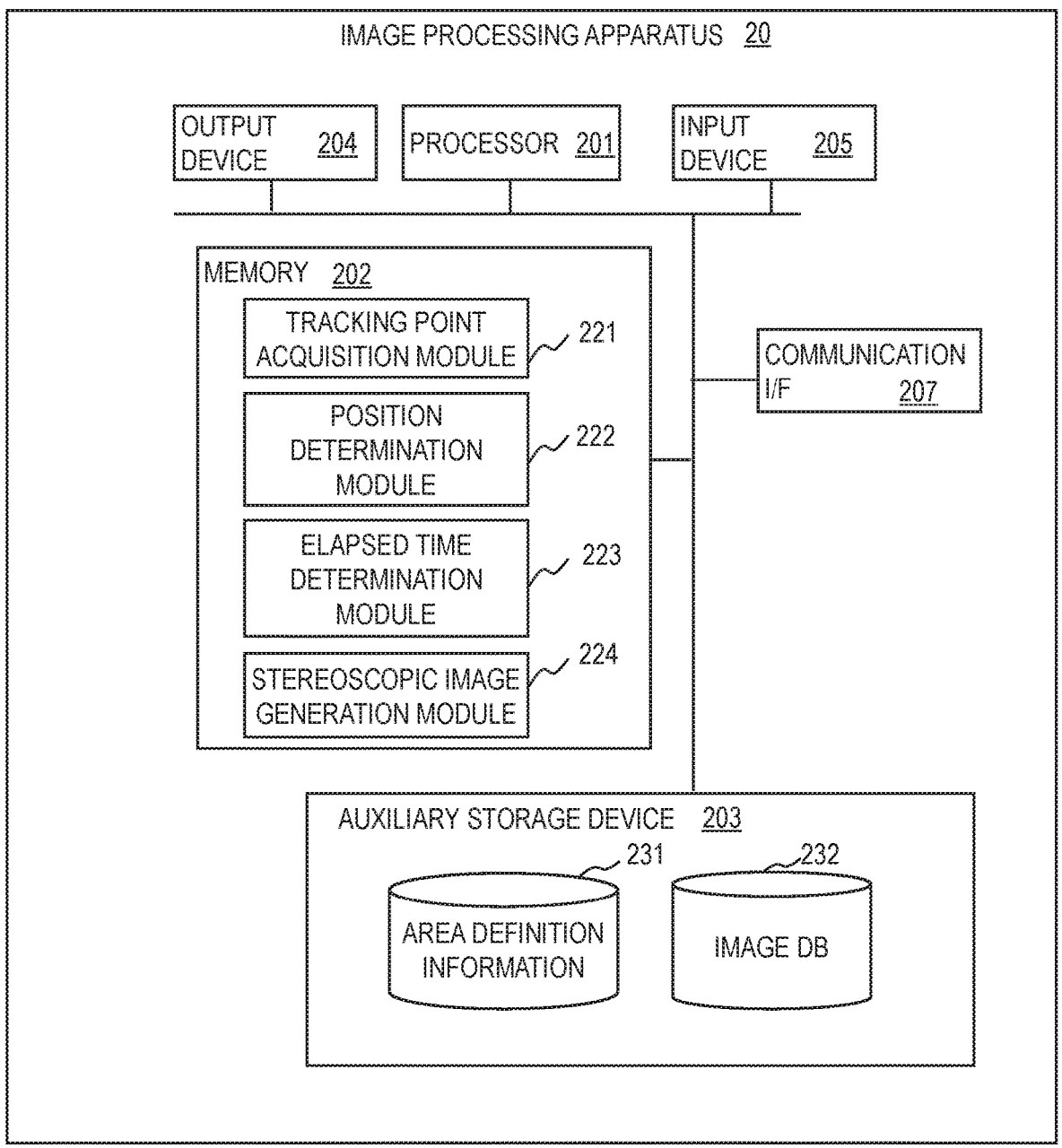
FIG. 2 illustrates a configuration example of an image processing apparatus.

FIG. 2 illustrates a configuration example of the image processing apparatus 20. The image processing apparatus 20 can have a common computer configuration. The image processing apparatus 20 includes a processor 201, a memory (primary storage device) 202, an auxiliary storage device 203, an output device 204, an input device 205, and a communication interface (I/F) 207. These constituent elements are interconnected by a bus. The memory 202, the auxiliary storage device 203, or the combination of these is a storage device.

The memory 202 can be a semiconductor memory and is mainly used to hold programs being executed and data. The processor 201 performs a variety of processing in accordance with the programs stored in the memory 202. The processor 201 operates in accordance with the programs to implement various function units. The auxiliary storage device 203 can be a large-capacity storage device such as a hard disk drive or a solid-state drive; it is used to hold programs and data on a long-term basis.

The processor 201 can be one or more processing units and include one or more computing units or a plurality of processing cores. The processor 201 can be implemented as one or more central processing units, microprocessors, microcomputers, microcontrollers, digital signal processors, state machines, logic circuits, graphic processing units, chip-on systems, and/or any device that operates a signal in accordance with control instructions.

The programs and data stored in the auxiliary storage device 203 are loaded to the memory 202 at the start-up or when needed and the programs are executed by the processor 201 to perform a variety of processing of the image processing apparatus 20. Accordingly, the processing performed by the image processing apparatus 20 is processing performed by the processor 201 or programs.

The input device 205 is a hardware device for the user to input instructions and information to the image processing apparatus 20. The output device 204 is a hardware device for presenting images for input and output, such as a display device or a printing device. The communication I/F 207 is an interface for connecting to a network. In this example, the image processing apparatus 20 communicates with the tracking device 30 through the communication I/F 207. The input device 205 and the output device 204 are optional and the image processing apparatus 20 can be accessed from a terminal via the network.

The functions of the image processing apparatus 20 can be implemented in a computer system that includes one or more computers equipped with one or more processors and one or more storage devices including a non-transitory storage medium. The computers communicate with one another via a network. For example, a part of the functions of the image processing apparatus 20 can be implemented in one computer and another part can be implemented in another computer.

The memory 202 of the image processing apparatus 20 stores a tracking point acquisition module 221, a position determination module 222, an elapsed time determination module 223, and a stereoscopic image generation module 224. These are programs including command codes to be executed by the processor 201. The memory 202 further stores a not-shown operating system and necessary temporary tables. The details of the processing of each program will be described later.

The auxiliary storage device 203 stores area definition information 231 and an image database 232. The area definition information 231 includes information on the tracking area and the optimum viewing point. The image database 232 stores image data for generating stereoscopic images to be displayed by the display apparatus 10.

In FIG. 2, software elements are shown in the auxiliary storage device 203 or the memory 202 for convenience of illustration; however, those elements can be stored in any areas of the storage devices. As described above, the processor 201 operates in accordance with a specific program to work as a specific function unit. For example, the processor works as a tracking point acquisition unit, a position determination unit, an elapsed time determination unit, and a stereoscopic image generation unit in accordance with the aforementioned programs.

Figure 3:
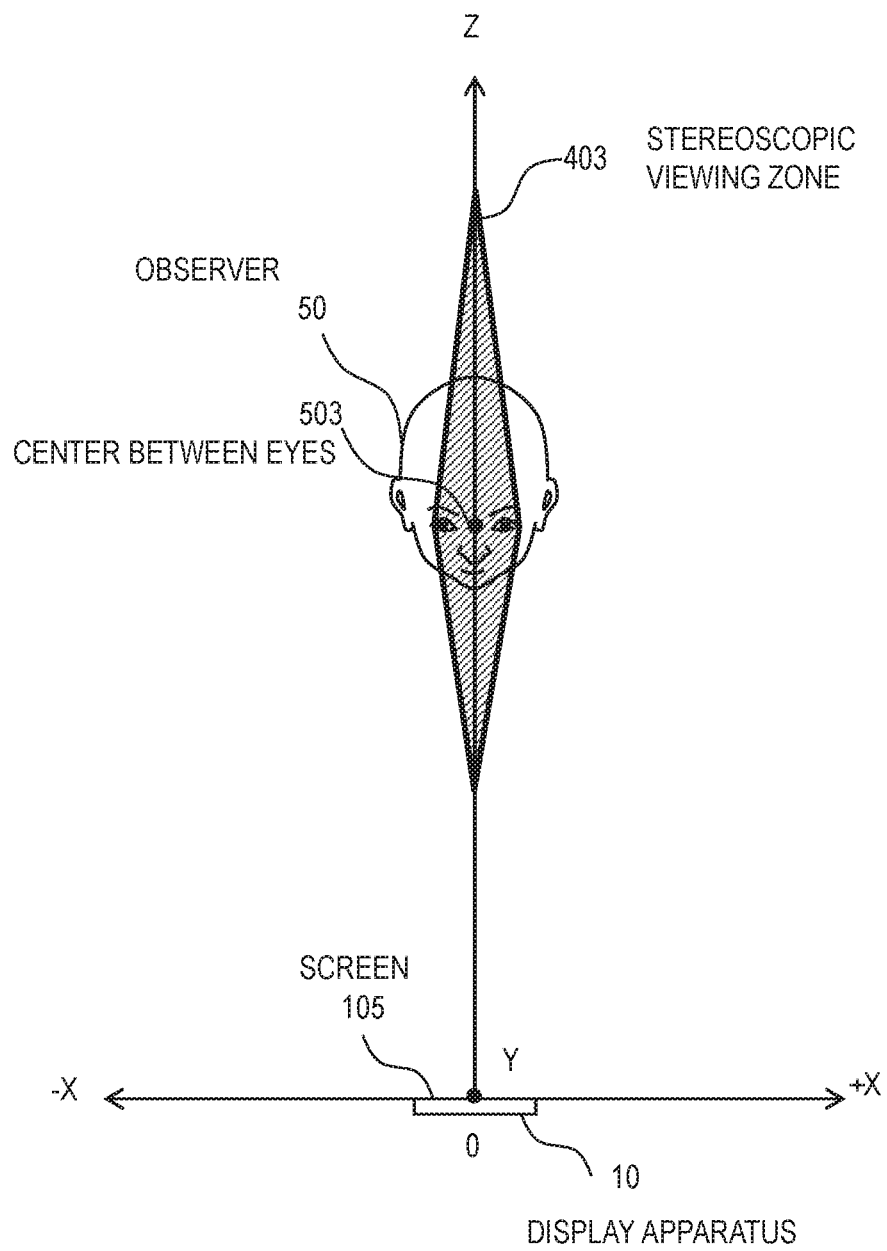
FIG. 3 is a plan diagram illustrating a stereoscopic viewing zone of a display apparatus.

FIG. 3 is an XZ-plane diagram illustrating the stereoscopic viewing zone of the display apparatus 10. As described above, a stereoscopic viewing zone in which the observer can recognize a stereo image is defined for the display apparatus 10. FIG. 3 illustrates an example of a stereoscopic viewing zone 403 composed of one continuous area. If the center between the eyes 503 of the observer 50 is located in the stereoscopic viewing zone 403, the observer 50 can recognize a stereo image appropriately. In defining the stereoscopic viewing zone 403, a specific value, for example 63 mm of the average pupillary distance of adult humans, is used as the distance between the eyes of the observer 50.

Figure 4:
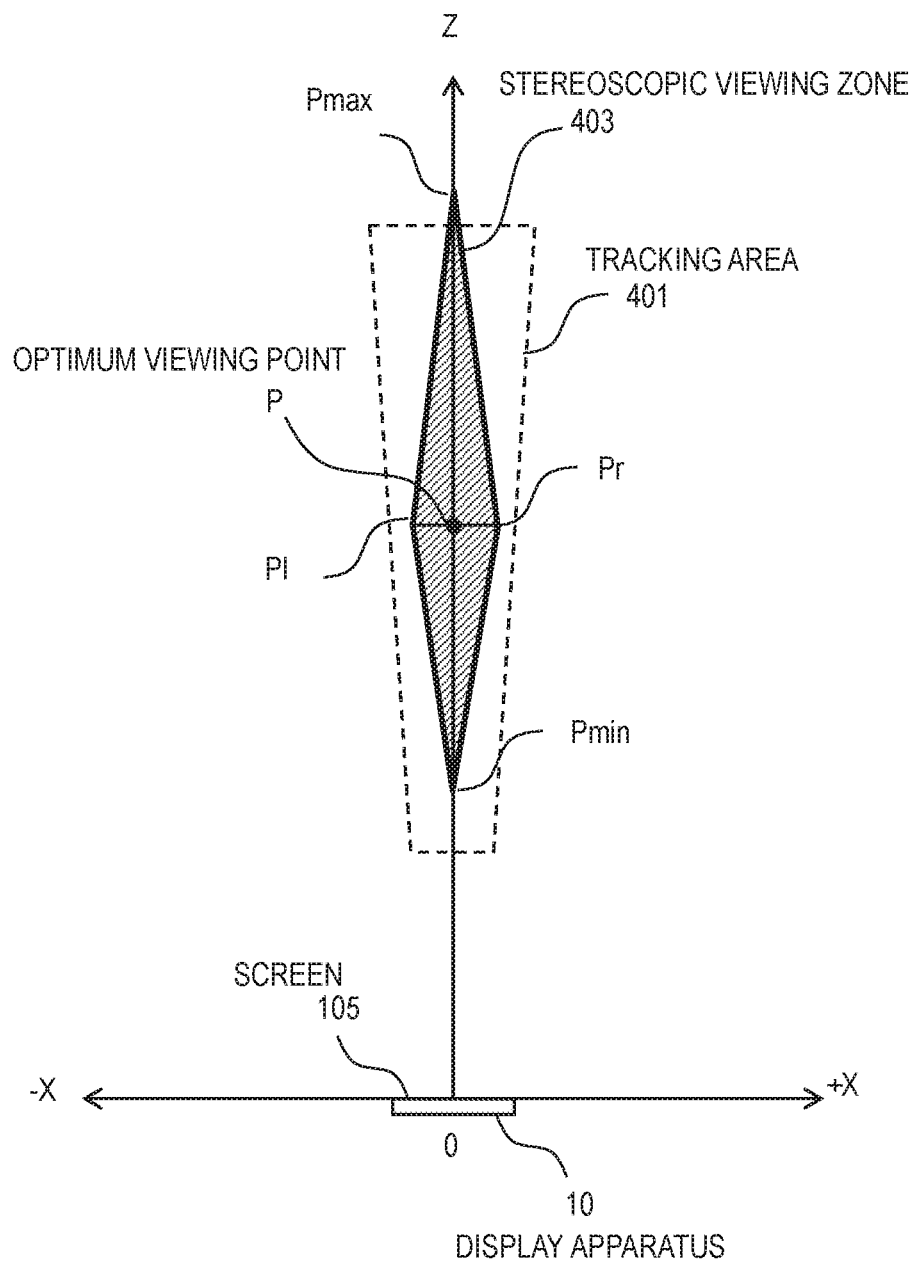
FIG. 4 illustrates an example of the relation among a stereoscopic viewing zone, an optimum viewing point, and a tracking area.

FIG. 4 illustrates an example of the relation among the stereoscopic viewing zone, the optimum viewing point, and the tracking area. In the example of FIG. 4, the tracking area 401 is one continuous area and includes a part of the stereoscopic viewing zone 403 and an area outside the stereoscopic viewing zone 403. The image processing apparatus 20 displays a stereoscopic image suitable for the position of the center between the observer's eyes in the tracking area 401. When the center between the observer's eyes is located outside the stereoscopic viewing zone 403, the image processing apparatus 20 may display a stereoscopic image suitable for the position closest to the center between the eyes in the stereoscopic viewing zone 403. As described above, the tracking area 401 can coincide with a part or the whole of the stereoscopic viewing zone 403 or include the whole stereoscopic viewing zone 403 and an area outside the stereoscopic viewing zone 403.

The optimum viewing point P is the intersection of the line connecting the maximum point Pmax and the minimum point Pmin of the stereoscopic viewing zone 403 in the Z-axis direction and the line connecting the maximum point Pr and the minimum point Pl of the stereoscopic viewing zone 403 in the X-axis direction. The maximum point Pmax and the minimum point Pmin in the Z-axis direction are the points located most distant and least distant from the screen 105. The maximum point Pr and the minimum point Pl in the X-axis direction are the points located rightmost and leftmost with respect to the screen 105. The optimum viewing point P is the point the movable range from which is the widest in the stereoscopic viewing zone 403.

Figure 5:
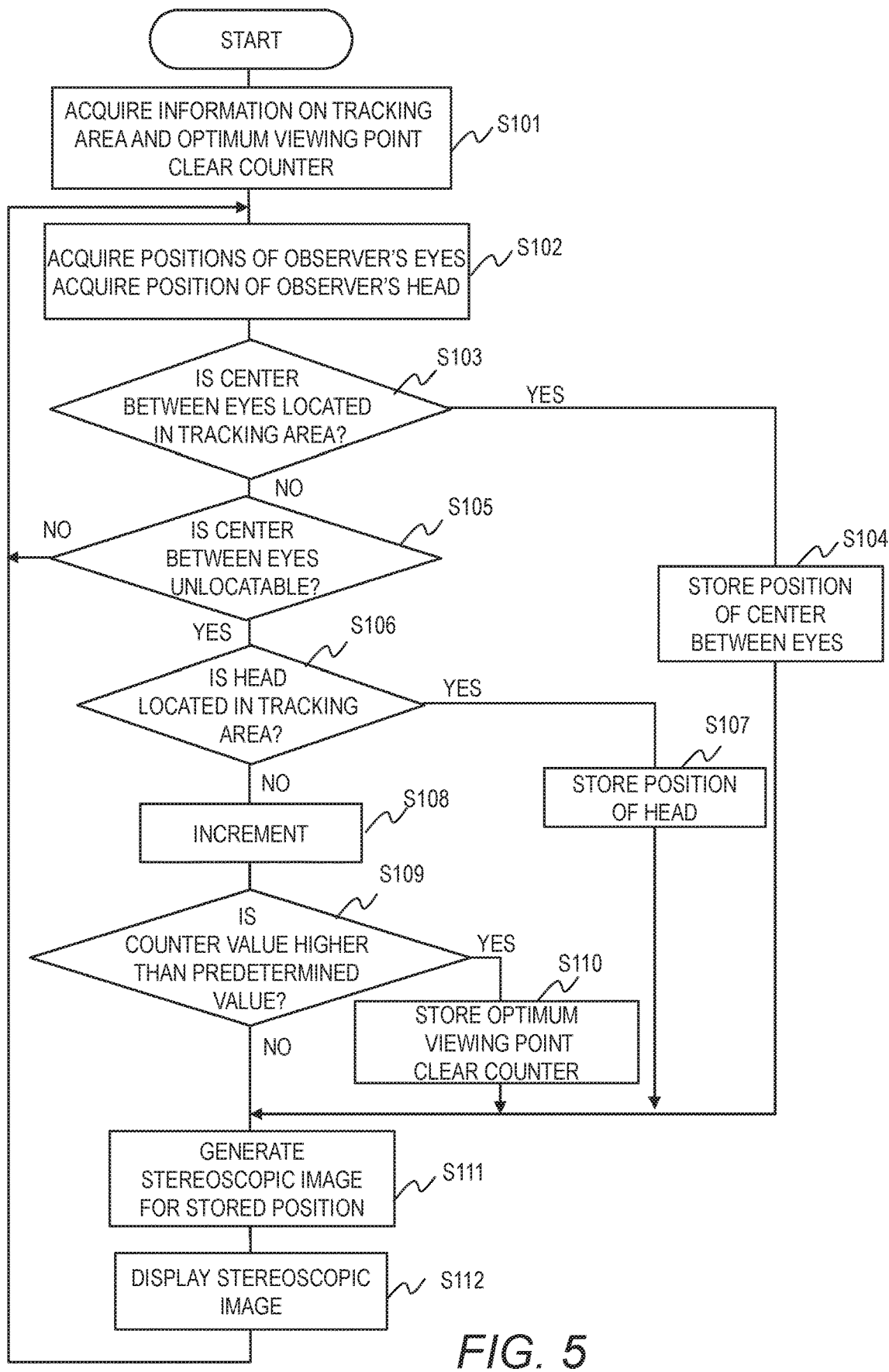
FIG. 5 is a flowchart of an example of processing of the image processing apparatus.

FIG. 5 is a flowchart of an example of processing of the image processing apparatus 20. FIG. 5 is an example of the processing in the case where only one observer is detected or one observer is selected from a plurality of observers in the tracking area 401. First, the image processing apparatus 20 performs initial setting (S101) at start-up, for example.

Specifically, the position determination module 222 acquires information on the tracking area and the optimum viewing point first from the area definition information 231. The acquired information is stored to the memory 202. Further, the elapsed time determination module 223 clears the counter for timing.

Next, the tracking point acquisition module 221 acquires data on the positions of the eyes and the head of the observer from the tracking device 30 (S102). The position determination module 222 determines whether the center between the eyes according to the acquired positions of the eyes is located within the tracking area (S103). If the center between the eyes is located within the tracking area (S103: YES), the position determination module 222 stores its position as the target point to the memory 202 (S104).

If the center between the eyes is located outside the tracking area (S103: NO and S105: NO), the position determination module 222 returns to Step S102. If the center between the eyes is unlocatable (S105: YES), the position determination module 222 determines whether the acquired position of the head is within the tracking area (S106). If the position of the head is within the tracking area (S106: YES), the position determination module 222 stores the position as the target point to the memory 202 (S107).

If the position of the head is outside the tracking area or unlocated (S106: NO), the elapsed time determination module 223 increments the counter (S108). The elapsed time determination module 223 determines whether the value of the counter is higher than a predetermined value (S109). If the counter value is higher than the predetermined value (S109: YES), the elapsed time determination module 223 stores the optimum viewing point as the target point to the memory 202 and clears the counter (S110).

The stereoscopic image generation module 224 generates a stereoscopic image suitable for the position held as the target point (S111). The stereoscopic image generation module 224 acquires image data from the image database 232 and processes the acquired image data based on the target point to generate the stereoscopic image suitable for the target point. The stereoscopic image generation module 224 outputs the generated stereoscopic image to the display apparatus 10 to display the stereoscopic image (S112). If no position is held as the target point (for example, after start-up), the stereoscopic image generation module 224 does not generate a stereoscopic image.

FIG. 6 illustrates an example of change of the position of a detected observer and the displayed image over time. At a time T1, the autostereoscopic display system 1 is started. It is determined that no observer is present in the tracking area 401. Since the predetermined time has not elapsed since the start-up, the display apparatus 10 does not display any image. At a time T2 after the predetermined time has elapsed since the time T1, no observer is detected. The autostereoscopic display system 1 displays a stereoscopic image suitable for the optimum viewing point P.

At a time T3, an observer 50 is detected in the tracking area 401. The autostereoscopic display system 1 generates and displays a stereoscopic image based on the position of the observer 50. At a time T4, the observer 50 is being tracked. The autostereoscopic display system 1 generates and displays a stereoscopic image based on the position of the observer 50.

At a time T5, no observer is detected in the tracking area 401. The predetermined time has not elapsed since the observer 50 is lost in the tracking area 401 and therefore, the autostereoscopic display system 1 generates and displays a stereoscopic image based on the last position of the observer 50.

At a time T6, time longer than the predetermined time has elapsed since the observer 50 is lost in the tracking area 401. The autostereoscopic display system 1 displays a stereoscopic image suitable for the optimum viewing point P. At a time T7, another observer 50 is detected in the tracking area 401. The autostereoscopic display system 1 generates and displays a stereoscopic image based on the position of the observer 50.

As described above, the autostereoscopic display system tracks an observer in the tracking area but does not track an observer outside the tracking area to generate and display a stereoscopic image based on the position of the observer in the tracking area. Since the tracking area is determined in advance and an observer outside the tracking area is not tracked, the display is prevented from flickering, which is caused by a passerby behind the observer in the tracking area or a person crossing in front of the display apparatus. This configuration of tracking an observer located in the tracking area enables displaying an image suitable for the observer.

When losing the observer within the tracking area, the autostereoscopic display system holds the position of the observer acquired last to generate and display a stereoscopic image based on the position. This configuration prevents the display from flickering in the case where the tracking device temporarily cannot track the observer in the tracking area for some reason.

When no observer is in the predetermined area, the autostereoscopic display system maintains the display for a predetermined time and thereafter, displays an image based on a predetermined position (optimum viewing point). Determining the optimum viewing point enables displaying a fixed image when no observer is present.

The autostereoscopic display system detects the eyes and the head (body) of the observer and displays a stereoscopic image based on the head (body) when it cannot detect the eyes. Detecting the observer's eyes and head prevents abrupt change of the display when the autostereoscopic display system cannot detect the eyes for a moment.

The optimum viewing point P can be determined to be any point, depending on the operating environment. For example, in the case of displaying a stereo image for a driver in a vehicle, the optimum viewing point P can be determined to be a point in front of the headrest of the driver's seat where the upper part of the driver's head is to be located. The driver in a vehicle will look at the sideview mirror or the rearview mirror to check the safety. When the driver's eyes cannot be detected during the safety check, the display will change abruptly. The abrupt change of the display may attract the driver's attention. If the reference position is determined to be the upper part of the driver's head, abrupt change of the display while driving is prevented.

The autostereoscopic display system can be configured to acquire the distance between the observer's eyes and control the light control element in accordance with the acquired distance between the eyes to define a stereoscopic viewing zone suitable for the observer. The optimum viewing point P can be determined to be the point the movable range from which is the widest in the stereoscopic viewing zone, as described above.

For the light control element, a light control element whose optical characteristics are electrically controllable can be employed, such as a parallax barrier variable in the position or the width of a slit or a liquid crystal lens variable in curvature. Then, the stereoscopic viewing zone optimum for the acquired distance between the observer's eyes can be defined. Defining the stereoscopic viewing zone suitable for the observer enables an appropriate stereo image to be displayed for an observer having a distance between the eyes different from the average one of adult humans, like a young child having a small skull.

Embodiment 2

Hereinafter, processing in the case where multiple observers are detected in the tracking area is described. When positions of a plurality of observers are acquired from the tracking area, the position determination module 222 of the image processing apparatus 20 generates a stereoscopic image based on the position of the observer closest to a predetermined position (second reference position). The second reference position can be the same as or different from the above-described reference position for displaying a stereoscopic image. In an example, the position determination module 222 selects the observer closest to the optimum viewing point. Selecting one person (observer) closest to the appropriate position (optimum viewing point) from a plurality of persons prevents the display from flickering.

If a plurality of observers closest to the optimum viewing point exist, the position determination module 222 maintains the position of an observer already held as the target point. Maintaining the position of the lastly selected observer as the target point and displaying the latest stereoscopic image prevent abrupt change of the display in the case where a plurality of observers are equally distant from the optimum viewing point.

Figure 7A:
FIG. 7A illustrates an example of the relation of change of the positions of two observers with the target position.

FIG. 7A illustrates an example of change of the positions of two observers. In the example in FIG. 7A, the observer 50A stands still and the observer 50B approaches the optimum viewing point P during the period from a time T1 to a time T2. As a result, the distance between the observer 50B and the optimum viewing point P becomes equal to the distance between the observer 50A and the optimum viewing point P. In this case, the position of the observer 50A is kept in the memory 202 as the target point.

Figure 7B:
FIG. 7B illustrates another example of the relation of change of the positions of two observers with the target position.

FIG. 7B illustrates another example of change of the positions of two observers. In the example in FIG. 7B, the observer 50A approaches the optimum viewing point P and the observer 50B moves away from the optimum viewing point P during the period from a time T1 to a time T2. As a result, the distance between the observer 50A and the optimum viewing point P becomes equal to the distance between the observer 50B and the optimum viewing point P. In this case, the position of the observer 50B is kept in the memory 202 as the target point.

If the observer's eyes cannot be located, the position determination module 222 determines the position of the observer's head (body) to be the target point, like in Embodiment 1. For example, when the observer A looks away from the screen 105 for a moment, the position of the head of the observer A is stored to the memory 202 as the target point. Holding the position of the observer's head eliminates tracking the observer's line of sight even if the observer looks away, so that abrupt change of the display can be prevented.

Embodiment 3

Figure 8:
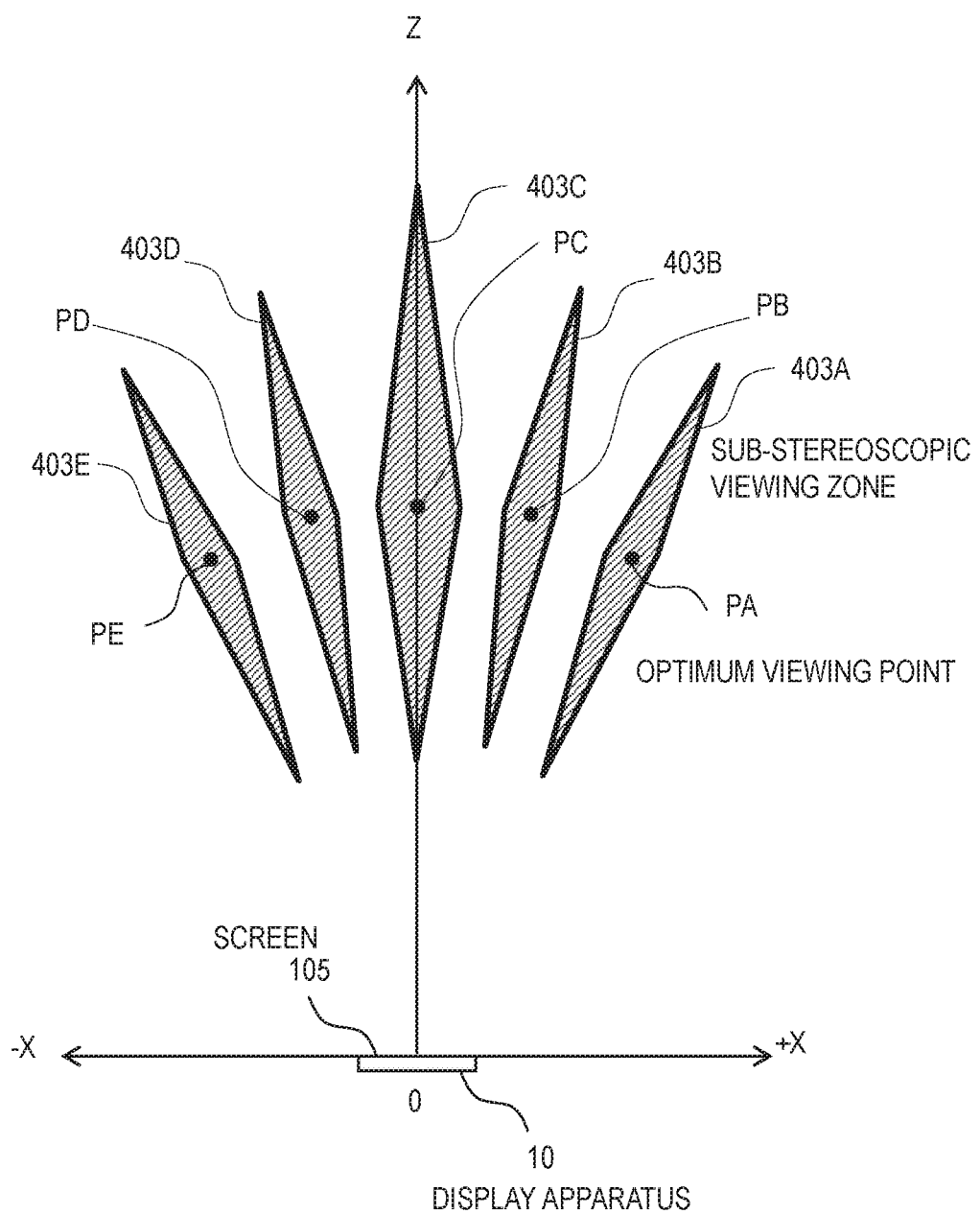
FIG. 8 illustrates an example of a stereoscopic viewing zone composed of a plurality of sub-stereoscopic viewing zones.

Hereinafter, processing in the case where the stereoscopic viewing zone is composed of a plurality of subzones is described. FIG. 8 illustrates another example of the stereoscopic viewing zone. The example of the stereoscopic viewing zone 403 described with reference to FIGS. 3 and 4 is composed of one continuous area. The example of the stereoscopic viewing zone in FIG. 8 is composed of a plurality of isolated subzones. Specifically, the stereoscopic viewing zone consists of sub-stereoscopic viewing zones 403A to 403E. In each of the sub-stereoscopic viewing zones 403A to 403E, an optimum viewing point is defined. Each of the optimum viewing points PA to PE in the sub-stereoscopic viewing zones 403A to 403E is defined as described with reference to FIG. 4.

Figure 9:
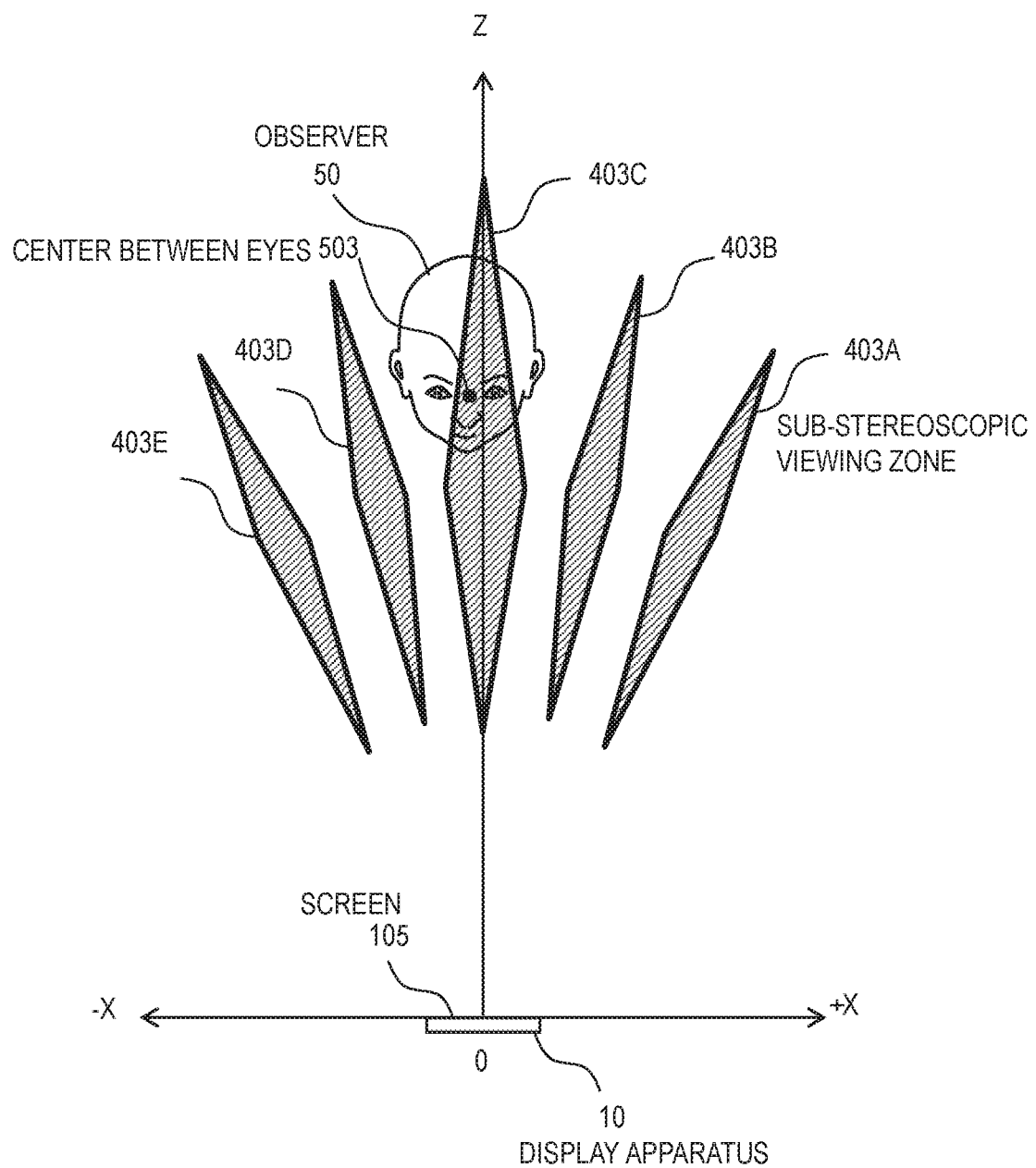
FIG. 9 illustrates an example where the center between the observer's eyes is located within a sub-stereoscopic viewing zone.
Figure 10:
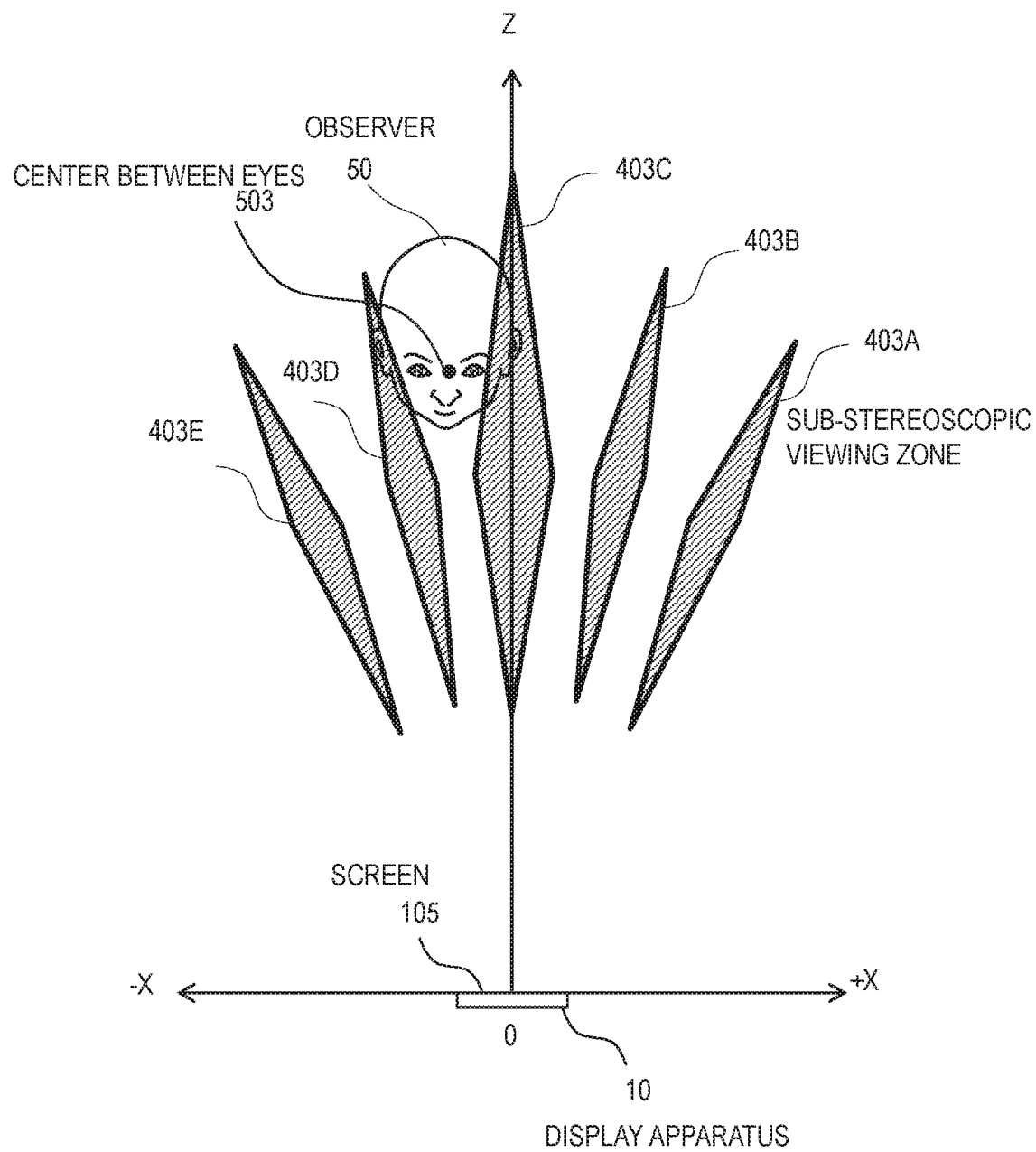
FIG. 10 illustrates an example where the center between the observer's eyes is not located within any of the sub-stereoscopic viewing zones.

If the center between the eyes 503 of an observer 50 is located in any of the sub-stereoscopic viewing zones 403A to 403E, namely, located within the stereoscopic viewing zone as illustrated in FIG. 9, the observer 50 can recognize a stereo image appropriately. However, if the center between the eyes 503 of an observer 50 is not located in any of the sub-stereoscopic viewing zones 403A to 403E, namely, located outside the stereoscopic viewing zone as illustrated in FIG. 10, the observer 50 cannot recognize a stereo image appropriately.

Figure 11:
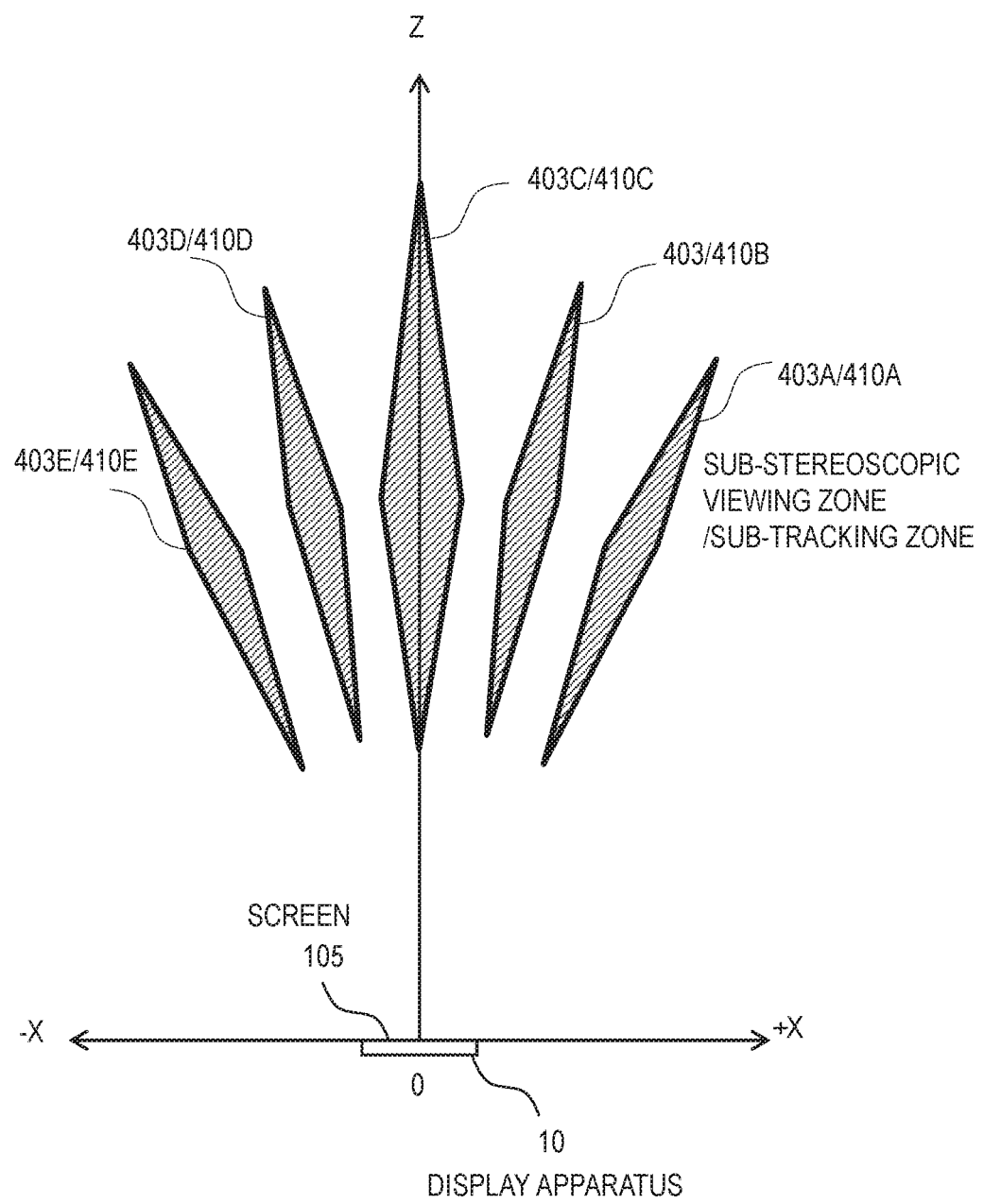
FIG. 11 illustrates an example of the relation between a stereoscopic viewing zone composed of a plurality of sub-stereoscopic viewing zone and the tracking area.

FIG. 11 illustrates an example of the relation between the stereoscopic viewing zone composed of sub-stereoscopic viewing zones 403A to 403E and the tracking area. The tracking area in FIG. 11 is composed of a plurality of subareas (sub-tracking areas) 410A to 410E, which coincide with the sub-stereoscopic viewing zones 403A to 403E. Each sub-tracking area can include an area outside the stereoscopic viewing zone or include only a part of the corresponding sub-stereoscopic viewing zone.

The sub-tracking areas 410A to 410E can be areas obtained by dividing one continuous area. In other words, the sub-tracking areas 410A to 410E can be continued. For example, each of the sub-tracking areas 410A to 410E includes the corresponding sub-stereoscopic viewing zone and an area outside the stereoscopic viewing zone located between sub-stereoscopic viewing zones.

Each of the sub-tracking areas 410A to 410E includes the optimum viewing point of the corresponding sub-stereoscopic viewing zone. In an example, the sub-tracking areas 410A to 410E are assigned different priorities in advance. Information on the sub-tracking areas and the priorities assigned thereto is stored in the area definition information 231.

The position determination module 222 selects sub-tracking areas 410A to 410E one by one in descending order of the priorities. If an observer is detected in the selected sub-tracking area, the position determination module 222 stores a target point to the memory 202 as described in Embodiment 1 and Embodiment 2. The processing after a sub-tracking area is selected is the same as the processing in Embodiment 1 and Embodiment 2. If no observer is detected in any of the sub-tracking areas, a stereoscopic image suitable for a predetermined optimum viewing point, which can be the optimum viewing point of the sub-tracking area assigned the highest priority, is displayed.

When a stereoscopic image for a selected sub-tracking area is on the display, the display can be changed to a stereoscopic image for a sub-tracking area having a higher priority, if an observer is detected there. The position determination module 222 can be configured to start searching for another sub-tracking area including an observer in order of the priority when a condition to display a stereoscopic image for the optimum viewing point is satisfied in a sub-tracking area being selected.

The position determination module 222 can be configured to select one sub-tracking area from the plurality of sub-tracking areas based on the distance between the optimum viewing point in each of the sub-tracking areas and the observer closest thereto. For example, in the case where some or all of the sub-tracking areas are assigned the same priority and observers are detected in the sub-tracking areas assigned the same priority, the position determination module 222 can select the sub-tracking area in which the distance between the optimum viewing point and the observer closest thereto is the shortest. All sub-tracking areas being assigned the same priority means that no priority is defined.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A stereoscopic display system comprising:
a display apparatus configured to display a three-dimensional (3D) stereoscopic image; and
a control system,
wherein the control system is configured to:
obtain information indicating a predetermined position in a stereoscopic viewing zone, wherein the predetermined position is located at an intersection of a first line and a second line, wherein the first line extends between ends of the stereoscopic viewing zone along a direction parallel to a screen of the display apparatus and the second line extends from ends of the stereoscopic viewing zone along a direction normal to the screen of the display apparatus;
acquire an image captured by an imaging device; and
display the 3D stereoscopic image on the display apparatus based on a position of an observer detected in a predetermined tracking area in the acquired image,
wherein the predetermined tracking area is a part of an area in which the observer is trackable and the predetermined tracking area coincides with the stereoscopic viewing zone in which a stereo image can be recognized from the 3D stereoscopic image,
wherein the control system includes an elapsed time determination module configured to count elapsed time while displaying the 3D stereoscopic image based on a position at which the observer is detected last after the detected observer has become untrackable in the predetermined tracking area,
wherein the control system is configured to display the 3D stereoscopic image suitable for the predetermined position in a case where no observer is detected in the predetermined tracking area until the elapsed time exceeds a predetermined value;
wherein the control system is configured to display the 3D stereoscopic image on the display apparatus based on a position of an observer located closest to the predetermined position among a plurality of observers detected in the predetermined tracking area, and
wherein the control system is configured to maintain a latest 3D stereoscopic image in a case where a plurality of observers located closest to the predetermined position are detected.

2. The stereoscopic display system according to claim 1, wherein the control system is configured to:
determine the position of the observer based on positions of eyes of the observer in a case where the eyes of the observer are detected; and
determine the position of the observer based on a position of a predetermined body part different from the eyes in a case where the eyes of the observer are not detected.

3. The stereoscopic display system according to claim 1,
wherein the predetermined tracking area includes a plurality of sub-tracking areas,
wherein each of the plurality of sub-tracking areas includes a stereoscopic viewing zone in which a stereo image can be recognized from a stereoscopic image displayed on the display apparatus, and
wherein the control system is configured to:
select the plurality of sub-tracking areas one by one in descending order of priorities assigned in advance until an observer is detected; and
display the 3D stereoscopic image based on a position of the detected observer.

4. A method of displaying a three-dimensional (3D) stereoscopic image on a display apparatus, comprising:
obtaining information indicating a predetermined position in a stereoscopic viewing zone, wherein the predetermined position is located at an intersection of a first line and a second line, wherein the first line extends between ends of the stereoscopic viewing zone along a direction parallel to a screen of the display apparatus and the second line extends from ends of the stereoscopic viewing zone along a direction normal to the screen of the display apparatus;
acquiring an image captured by an imaging device;
displaying the 3D stereoscopic image on the display apparatus based on a position of an observer detected in a predetermined tracking area in the acquired image, the predetermined tracking area being a part of an area in which the observer is trackable and coincides with the stereoscopic viewing zone in which a stereo image can be recognized from the 3D stereoscopic image,
counting elapsed time while displaying the 3D stereoscopic image based on a position at which the observer is detected last after the detected observer has become untrackable in the predetermined tracking area,
displaying the 3D stereoscopic image suitable for the predetermined position in a case where no observer is detected in the predetermined tracking area until the elapsed time exceeds a predetermined value,
wherein the 3D stereoscopic image is displayed on the display apparatus based on a position of an observer located closest to the predetermined position among a plurality of observers detected in the predetermined tracking area, and
wherein the control system is configured to maintain a latest 3D stereoscopic image in a case where a plurality of observers located closest to the predetermined position are detected.

5. The method according to claim 4, further comprising:
determining the position of the observer based on positions of eyes of the observer in a case where the eyes of the observer are detected; and
determining the position of the observer based on a position of a predetermined body part different from the eyes in a case where the eyes of the observer are not detected.

6. The method according to claim 4,
wherein the predetermined tracking area includes a plurality of sub-tracking areas,
wherein each of the plurality of sub-tracking areas includes a stereoscopic viewing zone in which a stereo image can be recognized from a stereoscopic image displayed on the display apparatus, and wherein the method further comprises:
    selecting the plurality of sub-tracking areas one by one in descending order of priorities assigned in advance until an observer is detected; and
    displaying the 3D stereoscopic image based on a position of the detected observer.

* * * * *